United States Patent
Imasaka

(10) Patent No.: US 10,900,408 B2
(45) Date of Patent: Jan. 26, 2021

(54) COOLING WATER CONTROL VALVE DEVICE

(71) Applicant: DENSO CORPORATION, Kariya (JP)

(72) Inventor: Yusuke Imasaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/676,094

(22) Filed: Nov. 6, 2019

(65) Prior Publication Data

US 2020/0072117 A1 Mar. 5, 2020

Related U.S. Application Data

(63) Continuation of application No. PCT/JP2018/017658, filed on May 7, 2018.

(30) Foreign Application Priority Data

May 9, 2017 (JP) .................................. 2017-093162

(51) Int. Cl.
- *F01P 7/14* (2006.01)
- *F01P 11/16* (2006.01)
- *F16K 31/00* (2006.01)

(52) U.S. Cl.
CPC .................. *F01P 7/14* (2013.01); *F01P 11/16* (2013.01); *F16K 31/002* (2013.01); *F01P 2007/146* (2013.01)

(58) Field of Classification Search
CPC .. F01P 7/16; F01P 7/14; F01P 2031/00; F16K 31/002; G05D 23/1333

USPC ....................................................... 123/41.08
See application file for complete search history.

(56) References Cited

U.S. PATENT DOCUMENTS

| | | | |
|---|---|---|---|
| 2014/0190427 A1 | 7/2014 | Nagahama et al. | |
| 2015/0122359 A1* | 5/2015 | Tsuchiya | F16K 5/04 137/625.47 |
| 2016/0273671 A1* | 9/2016 | Chang | F16K 11/0856 |
| 2017/0321595 A1* | 11/2017 | Jang | F16K 5/12 |
| 2019/0162106 A1* | 5/2019 | Lee | F01P 3/02 |

FOREIGN PATENT DOCUMENTS

| | | |
|---|---|---|
| JP | 60-126810 | 8/1985 |
| WO | 2015/091342 | 6/2015 |

* cited by examiner

*Primary Examiner* — Long T Tran
*Assistant Examiner* — James J Kim
(74) *Attorney, Agent, or Firm* — Nixon & Vanderhye PC

(57) ABSTRACT

A valve is configured to control a flow amount of cooling water flowing in a main passage. A detour passage connects an engine to the main passage through the valve. A failsafe valve includes a valve body, which operates independently from the valve and enables the detour passage to open or close, and a temperature detection medium which manipulates the valve body based on a temperature of cooling water and enables the detour passage to open or close. A branch point is point at which an inlet point in which cooling water from the engine flows is branched to a bypass passage and the detour passage. The temperature detection medium does not protrude to the branch portion and is housed in the detour passage.

8 Claims, 11 Drawing Sheets

COOLING WATER CONTROL VALVE DEVICE

CROSS REFERENCE TO RELATED APPLICATION

The present application is a continuation application of International Patent Application No. PCT/JP2018/017658 filed on May 7, 2018, which designated the U.S. and claims the benefit of priority from Japanese Patent Application No. 2017-093162 filed on May 9, 2017. The entire disclosures of all of the above applications are incorporated herein by reference.

TECHNICAL FIELD

The present disclosure relates to a cooling water control valve device.

BACKGROUND

Conventionally, a cooling water control valve device is provided to a vehicle to control a flow amount of cooling water flowing through a main passage of an engine cooling system and a flow amount of cooling water flowing through a bypass passage.

SUMMARY

A cooling water control valve device according to an aspect of the present disclosure controls a flow amount of cooling water, which flows through a main passage of an engine cooling system. The cooling water control valve device includes a valve to control a flow amount of cooling water flowing through a main passage, through which cooling water flows from an engine to a radiator, and a bypass passage, which bypasses the radiator to return cooling water to the engine.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
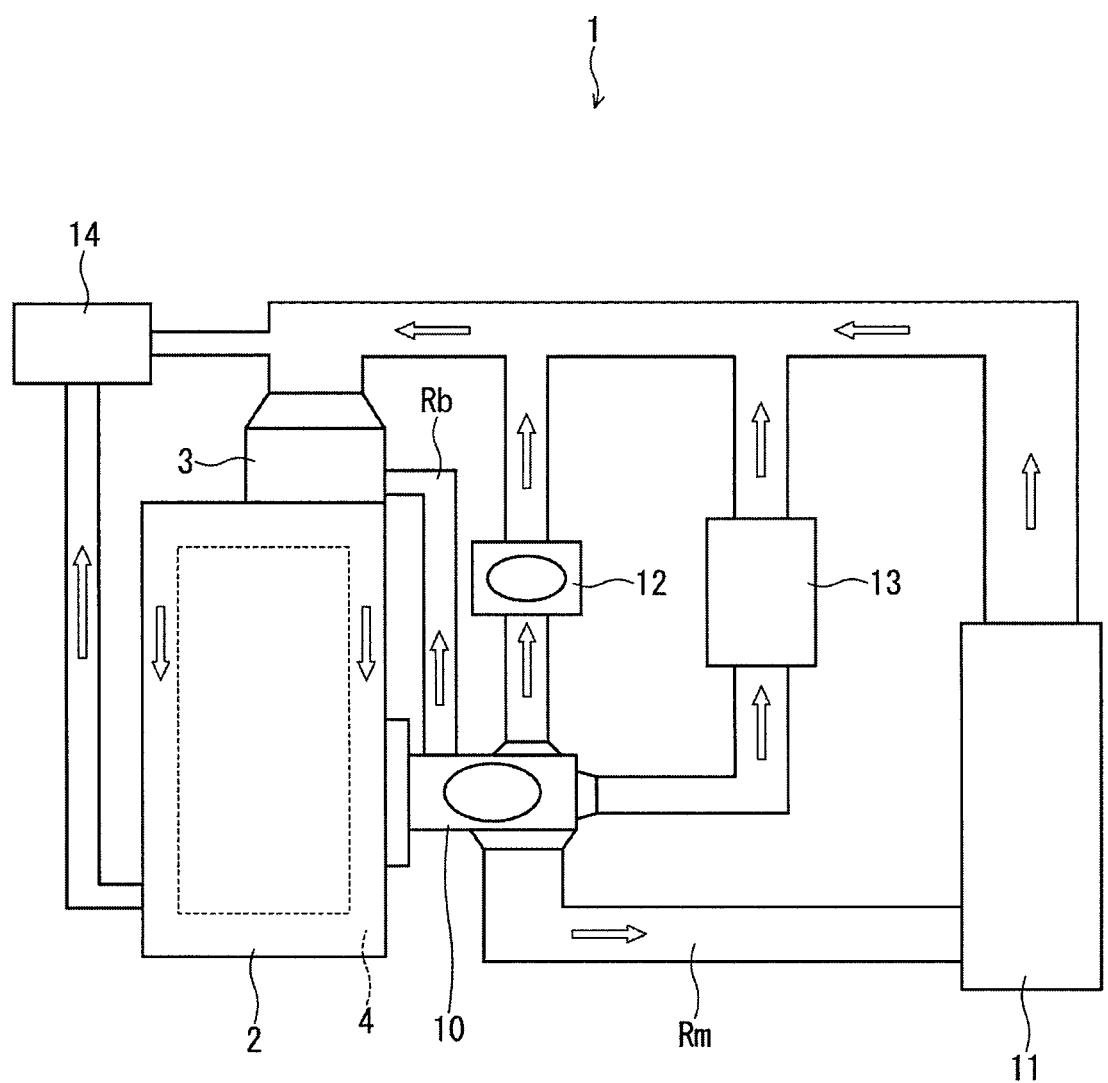
FIG. 1 is a schematic view showing engine cooling system applied the cooling water control valve device according to a first embodiment.

Hereinafter, one example of the present disclosure will be described.

According to the one example, an engine cooling system is provided to a vehicle. The engine cooling system includes a main passage, through which cooling water flows from an engine to a radiator, and a bypass passage which bypasses the radiator to return cooling water to the engine. The engine cooling system further includes a cooling water control valve device to control a flow amount of cooling water flowing through the main passage and a flow amount of cooling water flowing through the bypass passage.

In an assumable configuration, a cooling water control valve device may have a detour passage connecting a main passage with a bypass passage through the control valve. The detour passage may be equipped with a failsafe valve.

In this assumable configuration, the failsafe valve includes a temperature detection medium to open the detour passage when a water temperature exceeds a specific temperature, thereby to protect the engine from damage due to rapid temperature rise of cooling water.

Generally, an engine temperature detection medium circulates a large amount of water therethrough, and its cooling water temperature may get higher. Therefore, rapid detection of the cooling water temperature with the temperature detection medium may be required to open the detour passage in the case of abnormality.

In an assumable configuration of a cooling water control valve device, a temperature detection medium for a failsafe valve is provided on the bypass passage. In this assumable configuration, the temperature detection medium could cause Karman vortex on its downstream especially when a large amount of cooling water flows in the bypass passage. Consequently, the temperature detection medium at the bypass passage could prohibit cooling water from flowing to the downstream of the temperature detection medium and could increase a resistance against the cooling water flow. Therefore the flow amount of water from a heat source may decrease, and a thermal response of the temperature detection medium may be degraded.

According to a first aspect of the present disclosure, a cooling water control valve device controls a flow amount of cooling water, which flows through a main passage of an engine cooling system. The engine cooling system includes a main passage, through which cooling water flows from an engine to a radiator, and a bypass passage, which bypasses the radiator and is connected to the engine to return cooling water, which flows from the engine, to the engine. The cooling water control valve device comprises a valve configured to control a flow amount of cooling water flowing through the main passage. The cooling water control valve device further comprises a detour passage that bypasses the valve and connects the engine to the main passage. The cooling water control valve device further comprises a failsafe valve. The failsafe valve includes a valve body operational individually from the valve and configured to open and close the detour passage. The failsafe valve further includes a temperature detection medium configured to manipulate the valve body according to a temperature of cooling water to enable to open and close the bypass passage. A branch portion is a portion at which an inflow port, into which cooling water from the engine flows, is branched into the bypass passage and the detour passage. The temperature detection medium is entirely accommodated in the detour passage without protruding into the branch portion.

Therefore, when cooling water flows in the bypass passage, this configuration is enabled to restrain a resistance caused by the temperature detection medium against the flow of cooling water in the bypass channel. In this way, this configuration enables to restrain the increase in a flow resistance against cooling water flowing in the bypass channel. Thus, this configuration enables to restrain a decrease in the flow amount of water from a heat source and to improve a thermal response of the temperature detection medium.

According to a second aspect of the present disclosure, the temperature detection medium is provided at a position which is communicated to the inlet port and the bypass passage and is different from a channel directed from an inlet port, in which cooling water from the engine flows, to the bypass passage.

Therefore, when cooling water flows in the bypass passage, this configuration is enabled to restrain a resistance caused by the temperature detection medium against the flow of cooling water in the bypass channel and guide cooling water to cooling water to flow to the temperature detection medium. Thus, this configuration enables to restrain a decrease in the flow amount of water from the heat source and improve a thermal response of the temperature detection medium.

According to the third aspect of the present disclosure, a bypass passage opening, which is an inlet port of the bypass passage, and the temperature detection medium are equipped in this order toward the detour passage from an inlet port, in which cooling water from the engine flows.

Therefore, when cooling water flows in the bypass passage, this configuration is enabled to restrain a resistance caused by the temperature detection medium against the flow of cooling water in the bypass channel and guide cooling water to cooling water to flow to the temperature detection medium. Thus, this configuration enables to restrain a decrease in the flow amount of water from the heat source and improve a thermal response of the temperature detection medium.

According to the fourth aspect of the present disclosure, a cooling water control valve device controls a flow amount of cooling water, which flows through a main passage of an engine cooling system. The engine cooling system includes a main passage, through which cooling water flows from an engine to a radiator, and a bypass passage, which bypasses the radiator and is connected to the engine to return cooling water, which flows from the engine, to the engine. The cooling water control valve device comprises an inlet port that is provided among the engine, the main passage and the bypass passage and into which cooling water from the engine flows. The cooling water control valve device further comprises a main passage opening that is connected to the main passage and into which cooling water to the main passage flows. The cooling water control valve device further comprises a bypass passage opening that is connected to the bypass passage and into which cooling water to the bypass passage flows. The cooling water control valve device further comprises a main channel that connects the inlet port to the main passage opening. The cooling water control valve device further comprises a bypass channel that connects the inlet port to the bypass passage opening. The cooling water control valve device further comprises a housing that includes a detour passage that bypass a valve and connects the bypass channel to the main passage. The cooling water control valve device further comprises the valve that is housed in the housing and configured to control a flow amount of cooling water flowing from the inlet port to the main passage. The cooling water control valve device further comprises a failsafe valve. The failsafe valve includes a valve body operational individually from the valve and configured to open and close the detour passage. The failsafe valve further includes a temperature sensing medium configured to manipulate the valve body according to a temperature of cooling water to enable to open and close the bypass passage.

According to the fourth aspect of the present disclosure, the temperature detection medium is housed in the detour passage without protruding the bypass channel. Therefore, when cooling water flows in the bypass passage, this configuration is enabled to restrain a resistance by the temperature detection medium against the flow of cooling water in the bypass channel. This configuration enables to restrain the increase in a flow resistance against cooling water flowing in the bypass channel. Therefore, this configuration enables to restrain a decrease in the flow amount of water from the heat source and improve a thermal response of the temperature detection medium.

In this way, the first to fourth aspects of the present disclosure could enhance thermal response of the cooling water control valve device.

As follows, a cooling water control valve device according to multiple embodiments will be described with reference to drawings. Substantially equivalent elements in the multiple embodiments are denoted with the same reference numeral, and description therefore will be omitted. Substantially equivalent elements in the multiple embodiments produce the same or equivalent operational effect.

First Embodiment

Figure 2:
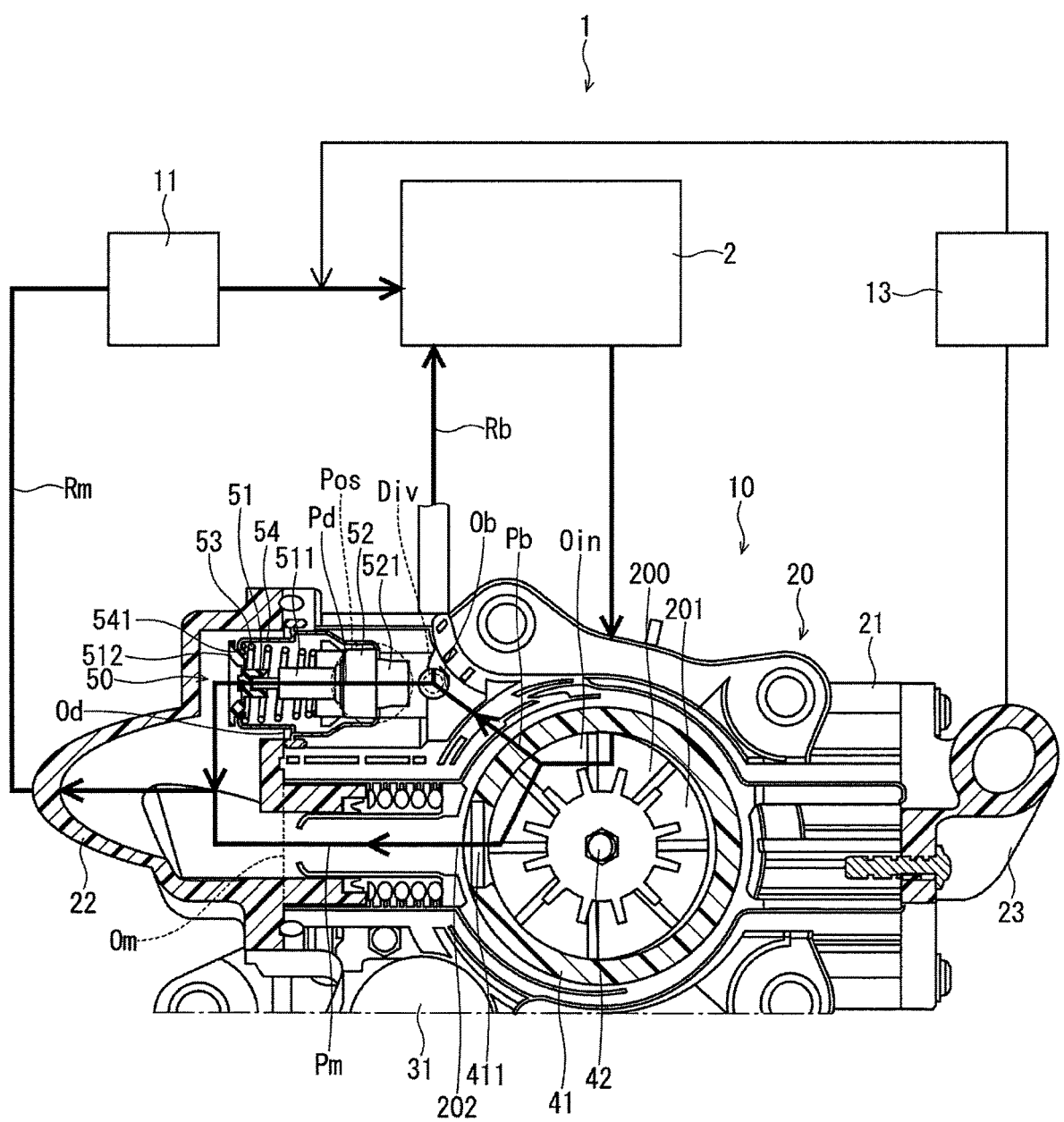
FIG. 2 is a cross-sectional side view showing a part of the cooling water control valve device according to the first embodiment.
Figure 3:
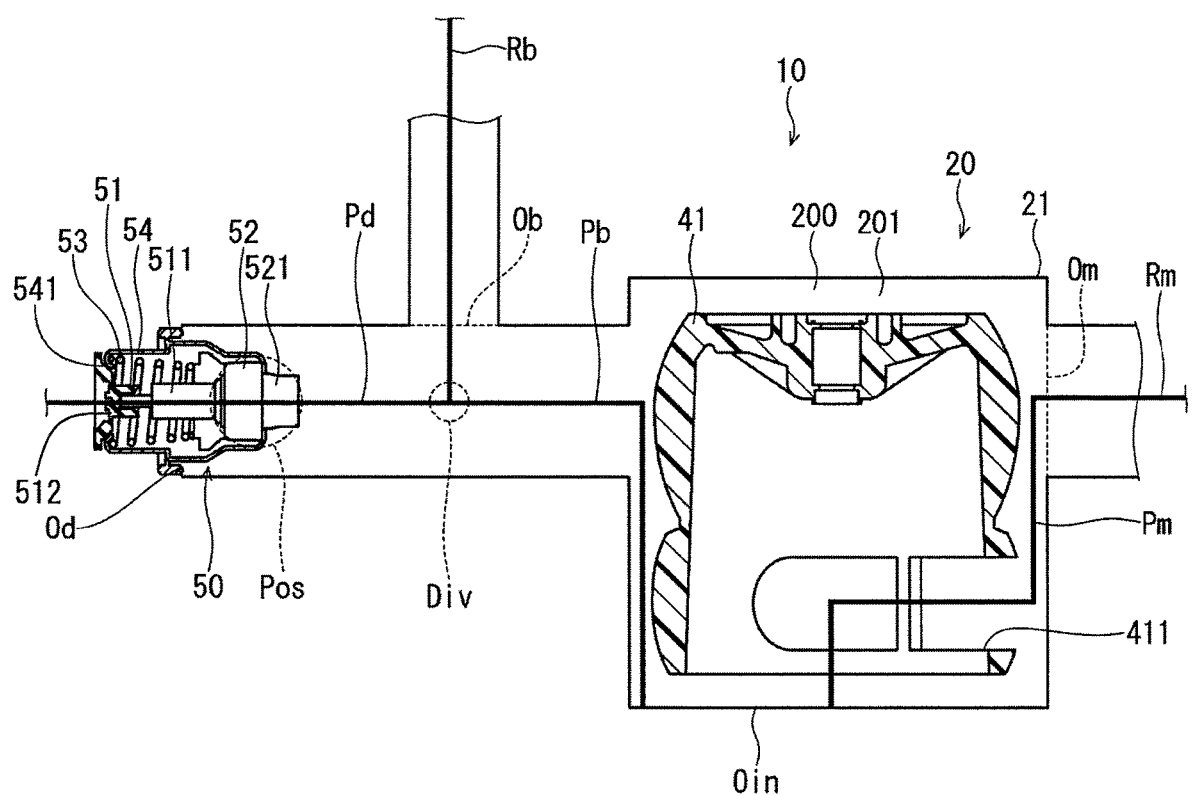
FIG. 3 is a typical cross-sectional side view showing a part of the cooling water control valve device according to the first embodiment.

FIGS. 1 to 3 show a cooling water control valve device according to a first embodiment. A cooling water control valve device 10 is, for example, used to control a flow amount of cooling water to cool an engine 2 of an unillustrated vehicle. The cooling water control valve device 10 controls the flow amount of cooling water which flows in a main passage Rm of the engine cooling system 1 of the vehicle.

As shown in FIG. 1, the vehicle includes the engine cooling system 1, the engine 2, the cooling water control valve device 10, a water pump 3, a radiator 11, an oil cooler 12, a heater 13, an EGR valve 14, and the like. The engine cooling system 1 includes a main passage Rm and a bypass passage Rb. The water pump 3 is provided to the engine 2 and is connected to a water jacket 4. The water pump 3 operates with a driving force of the engine 2, applies pressure to inflowing cooling water, and discharges the cooling water to the water jacket 4. The cooling water control valve device 10 is provided to the engine 2 and connected to the water jacket 4. The cooling water control valve device 10 is configured to receive cooling water in the water jacket 4.

A main passage Rm connects the water jacket 4 of the engine 2 to the radiator 11 through the cooling water control valve device 10. This enables cooling water in the water jacket 4 to flow to the radiator 11 through the cooling water control valve device 10 and the main passage Rm. The radiator 11 dissipates heat from inflowing cooling water. Cooling water decreases in temperature at the radiator 11 and flows into the water jacket 4 of the engine 2 through the water pump 3. Cooling water at low temperature flows into the water jacket 4 and enables to cool the engine 2. The cooling water control valve device 10 is configured to control the flow amount of cooling water which flows in the main passage Rm, that is, the flow amount of cooling water which flows from the engine 2 to the radiator 11.

A bypass passage Rb connects the water jacket 4 of the engine 2 to the water pump 3 through the cooling water control valve device 10. That is, the bypass passage Rb is a passage bypassing the radiator 11 and connects to the engine 2 to return cooling water to the engine 2. Warming of the engine 2 is promoted by bypassing the radiator 11 to r return cooling water from the water jacket 4 of the engine 2 to the engine 2 when such as the engine 2 starts. In this embodiment, the cooling water control valve device 10 does not control a flow amount of cooling water which flows in the by bypass passage Rb. Therefore, the cooling water control valve device 10 warms up the engine 2 by regulating a flow amount of cooling water in the main passage Rm and the radiator 11 when the engine 2 is started.

The oil cooler 12 is provided between the cooling water control valve device 10 and the water pump 3. Cooling water from the water jacket 4 of the engine 2 flows into the oil cooler 12 through the cooling water control valve device 10 and returns to the engine 2. In this way, the oil cooler 12 enables to rise a temperature of lubricating oil. The configuration enables to decrease a viscosity of the lubricating oil even when an environmental temperature is low. The cooling water control valve device 10 is configured to control a flow amount of cooling water flowing in the oil cooler 12.

The heater 13 is provided between the cooling water control valve device 10 and the water pump 3. Cooling water from the water jacket 4 of the engine 2 flows into the heater 13 through the cooling water control valve device 10 and returns to the engine 2. The heater 13 enables to rise a temperature in a compartment of the vehicle. The cooling water control valve device 10 is configured to control a flow amount of cooling water flowing in the heater 13.

According to the present embodiment, the EGR valve 14 is configured to perform exhaust gas recirculation (EGR) to decrease a concentration of nitrogen oxide by recirculating exhaust gas from the engine 2 into intake air. The EGR valve 14 is configured to control a flow amount of exhaust gas flowing through a passage connecting an air exhaust passage to an air intake passage of the engine 2. The EGR valve 14 is provided between the water jacket 4 of the engine 2 and the water pump 3. The configuration enables to return cooling water discharged from the water jacket 4 to the engine 2 through the EGR valve 14. This enables to cool the EGR valve 14. While the engine 2 is in operation, cooling water circulates through the water pump 3, the water jacket 4, and the EGR valve 14.

As shown in FIG. 2, the cooling water control valve device 10 includes a housing 20, a motor 31, a valve 41, a shaft 42, a failsafe valve 50, and the like. The housing 20 includes a housing main body 21, pipe portions 22, 23, and the like. The housing main body 21, the pipe portions 22, 23 are made of a resin or the like. The housing main body 21 includes an inlet ports Oin, a main passage opening Om, an bypass passage opening Ob, an opening of a detour passage Od, a main channel Pm, a bypass channel Pb, a detour passage Pd, and the like. The housing main body 21 includes a space 200.

The interior of the housing main body 21 which is the space 200 is connected to the exterior through the inlet ports Oin, a main passage opening Om, a bypass passage opening Ob, a detour passage opening Od. A valve chamber 201 is formed in a specific portion of the space 200 and connected to the inlet port Oin. The main passage Pm is formed in the space 200 and connects the inlet port Oin to the main passage opening Om. A passage hole portion 202 is formed in the main channel Pm in the housing main body 21 and connects the valve chamber 201 to the main passage opening Om. The bypass channel Pb is formed in the space 200 and connects the inlet port Oin to the opening of a bypass passage Ob. The detour passage Pd is formed in the space 200 and connects the bypass channel Pb to the detour passage opening Od. The housing main body 21 is provided to the engine 2 such that the inlet port Oin connects to the water jacket 4 of the engine 2. In this way, cooling water in the water jacket 4 is enabled to flow through the inlet port Oin into the housing main body 21, that is, into the space 200.

The pipe portions 22, 23 are in tubular forms. The pipe portion 22 is provided to the housing main body 21, such that its opening on the side of one end is connected to the main passage opening Om and the detour passage opening Od. An opening of the other end of the pipe portion 22 is connected to the radiator 11. That is, a part of the main passage Rm is formed in the pipe portion 22. An end of the detour passage Pd on the opposite side of the bypass passage Pb connects to the main passage Rm through the detour passage opening Od in the pipe portion 22. The pipe portion 23 is provided to the housing main body 21 such that its opening on one end side is connected to the valve chamber 201. An opening of other end of pipe portion 23 is connected to the heater 13. The bypass passage opening Ob is connected to the other end of the bypass passage Rb on the engine 2.

The motor 31 is provided in a different space from the space 200 in the housing 20. The motor 31 is configured to output torque by energization. The valve 41 is tubular form with bottom and made of a resin or the like. A valve hole portion 411 is provided to the valve 41 and connects inner side to outside of the tube. The valve 41 is provided in the valve chamber 201, such that its opening which is on the opposite side of the bottom portion is directed to the inlet port Oin. The shaft 42 is in a bar shape and made of a metal or the like. The shaft 42 is inserted into a shaft hole in the bottom of the valve 41 and anchored on the valve 41 not to rotate relatively with the valve 41. The housing main body 21 rotationally supports the shaft 42. In this way, the housing main body 21 supports the shaft 42 and the valve 41 to enable the shaft 42 and the valve 41 to rotate relatively to the housing main body 21.

An unillustrated power transmission part connects the motor 31 to the shaft 42. In this way, the torque output from the motor 31 is transmitted to the shaft 42. Therefore, the valve 41 rotates about the axis of the shaft 42 in the valve chamber 201 when the motor 31 rotates. An over lapped area between the valve hole portion 411 and the passage hole portion 202 changes depending on the rotational position of the valve 41.

When the over lapped area between the valve hole portion 411 and the passage hole portion 202 becomes larger than 0 by the rotation of the valve 41, the inlet port Oin is communicated to the main passage opening Om through the valve hole portion 411 which is the opening on the opposite side of the bottom of the valve 41. This operation enables cooling water in the water jacket 4 to flow to the radiator 11 through the inlet port Oin, an opening of the valve 41, the valve hole portion 411, the main passage opening Om, and the main passage Rm. That is, the main channel Pm is provided in the space 200 and connects the inlet port Oin to the main passage opening Om through the opening of the valve 41 and the valve hole portion 411.

The control of the rotational position of the valve 41 by the motor 31 enables to control the flow amount of cooling water flowing in the main passage Rm, that is, the flow amount of the cooling water flowing to the radiator 11 from the engine 2. The control of the rotational position of the valve 41 by the motor 31 also enables to control a flow amount of cooling water flowing in the oil cooler 12 and the heater 13.

The bypass channel Pb is formed in the space 200 and connects the inlet port Oin to the bypass passage opening Ob through a space between an outer wall of the valve 41 and an inner wall of the housing main body 21. Therefore, the bypass channel Pb enables cooling water to flow into the bypass passage opening Ob from the inlet port Oin regardless of the rotational position of the valve 41. In this way, while the engine 2 is in operation, cooling water in the water jacket 4 flows through the inlet port Oin, the bypass channel Pb, the bypass passage opening Ob, and the bypass passage Rb and returns to the water jacket 4.

As described above, the detour passage Pd connects the bypass channel Pb to the main passage Rm. One end side of the detour passage Pd is connected to the bypass channel Pb in the housing main body 21, and the other end is connected to the main passage Rm in the pipe portion 22. The detour passage Pd is the passage connecting the bypass channel Pb to the main passage Rm through the valve 41. That is, the detour passage Pd is the passage connecting the engine 2 to the main passage Rm through the valve 41.

The failsafe valve 50 includes a valve body 51, a temperature detection medium 52, a spring 53, a support 54, and the like. The support 54 is in a tubular form and made of a metal or the like. The support 54 is provided to the detour passage opening Od. One end side of the support 54 is located in the housing main body 21, and the other end side of the support 54 is located in the pipe portion 22. That is, the support 54 is provided in the detour passage Pd, and its axis is provided along the detour passage Pd. The outer wall of the support 54 is liquid-tightly in contact to the inner wall of the housing main body 21. A valve seat 541 is provided on the other end of the support 54.

The valve body 51 includes a shaft portion 511 and a valve portion 512. The shaft portion 511 is in a bar shape and configured to reciprocate along an axial direction of the support 54. The valve portion 512 is in, such as, an approximately disk shape and connected to one end of the shaft portion 511. The valve portion 512 is configured to abut against the valve seat 541 on the other end side of the support 54, that is, is configured to close the valve seat 541. The valve portion 512 reciprocates along the axial direction with the shaft portion 511 and abuts against the valve seat 541 or is separated from the valve seat 541. When the valve portion 512 abuts against the valve seat 541, the detour passage Pd is closed. On the other hands, when the valve portion 512 is separated from the valve seat 541, the detour passage Pd opens. As follows, a direction in which the valve portion 512 is separated from the valve seat 541 is referred to as "valve opening direction", while a direction in which the valve portion 512 abuts against the valve seat 541 is referred to as "valve closing direction".

The temperature detection medium 52 includes a temperature sensitive portion 521. The temperature sensitive portion 521 includes wax such as a thermowax. The temperature detection medium 52 is provided in the one end of the support 54 which is opposite side to the valve seat 541. That is, the temperature detection medium 52 is provided to the detour passage Pd. The temperature detection medium 52 is housed entirely in the detour passage Pd. The temperature detection medium 52 is connected to the opposite end of the shaft portion 511 to the valve portion 512.

The spring 53 is a helical spring and provided in the support 54. The spring 53 biases the shaft portion 511 in a valve closing direction. This operation enables the valve portion 512 to abut against the valve seat 541 to be in a valve close state. The temperature detection medium 52 expands when the temperature of cooling water in the detour passage Pd is raised to a specific temperature or above to press the shaft portion 511 in the valve opening direction against the urging force of the spring 53. This operation enables the valve portion 512 to separate from the valve seat 541 to be in a valve open state. In this embodiment, the above specific temperature, that is, the temperature at which the failsafe valve 50 opens, is set around 110 degree Celsius.

In this way, the failsafe valve 50 includes the valve body 51, which operates independently from the valve 41 and enables to open and close the detour passage Pd, and the temperature detection medium 52 which manipulate the valve body 51 based on the temperature of cooling water and enable to open and close the detour passage Pd.

Figure 4:
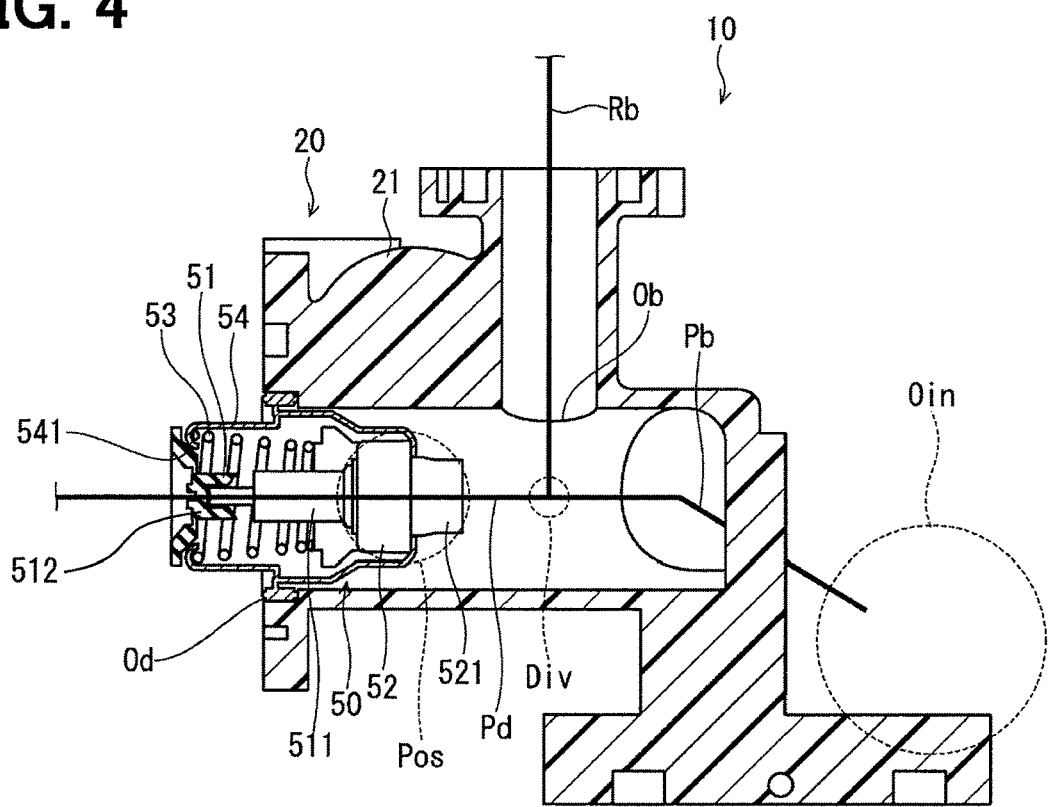
FIG. 4 is a typical cross-sectional side view showing a part of the cooling water control valve device according to the first embodiment.
Figure 5:
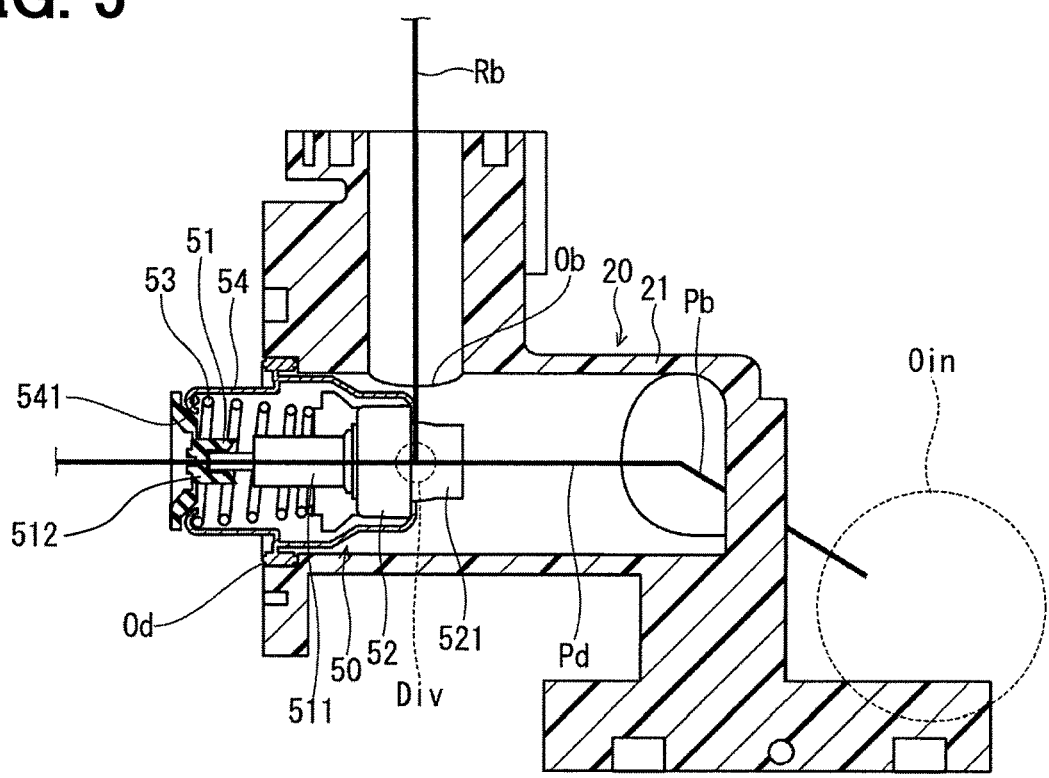
FIG. 5 is a typical cross-sectional side view showing a part of the cooling water control valve device according to a comparative embodiment.

The followings describe the difference in cooling water flow between the cooling water control valve device 10 of the present embodiment and the other cooling water control valve device according to a comparative embodiment with reference to FIGS. 4 to 7. FIG. 4 shows the failsafe valve 50 of the cooling water control valve device 10 of the present embodiment and its peripheral component schematically. FIG. 5 shows the failsafe valve 50 of the cooling water control device of the comparative embodiment and its peripheral component schematically.

As shown in FIG. 4, in the present embodiment, the branch point Div is a point at which the inlet point Oin in which cooling water from the engine 2 flows is branched to the bypass passage Rb and the detour passage Pd. In this embodiment, the temperature detection medium 52 does not protrude to the branch portion Div and is housed in the detour passage Pd. In other words, the temperature detection medium 52 does not protrude to the bypass channel Pb and is housed in the detour passage Pd. Further in other words, the temperature detection medium 52 is provided at the position Pos which is communicated to the inlet port Oin and the bypass passage Rb, not in the bypass channel Pb which is a passage connecting the inlet port Oin in which cooling water from the engine 2 flows to the bypass passage Rb. Further in other words, the temperature detection medium 52 is provided at the position Pos which is at a distance equal to or more than a predetermined distance from the bypass channel Pb which is a passage connecting the inlet port Oin to the bypass passage opening Ob in the shortest distance. In addition, according to the embodiment, the bypass passage opening Ob, which is an inlet port for the bypass passage Rb, and the temperature detection medium 52 are equipped in this order toward the detour passage Pd from the inlet port Oin in which cooling water from the engine 2 flows. In the present embodiment, the bypass passage opening Ob is provided on the side of the inlet port Oin relative to the temperature detection medium 52 in a passage connecting the inlet port Oin to the main passage Rm through the bypass channel Pb and the detour passage Pd.

On the other hand, in the comparative embodiment shown in FIG. 5, the temperature detection medium 52 is provided in the detour passage Pd and the bypass channel Pb and protruded to the branch point Div. In other words, the temperature detection medium 52 is provided to the detour passage Pd and protruded to the bypass channel Pb. Further in other words, the temperature detection medium 52 is provided in a passage from the inlet port Oin into which cooling water flows to the bypass passage Rb, that is, in the bypass passage Rb. Further in other words, the temperature detection medium 52 is provided in the bypass channel Pb connecting the inlet port Oin to the bypass passage opening Ob in the shortest distance. In addition, according to the comparative embodiment, the temperature detection medium 52 and the bypass passage opening Ob, which is an inlet port for the bypass passage Rb, are equipped in this order toward the detour passage Pd from the inlet port Oin in which cooling water from the engine 2 flows.

Figure 6:
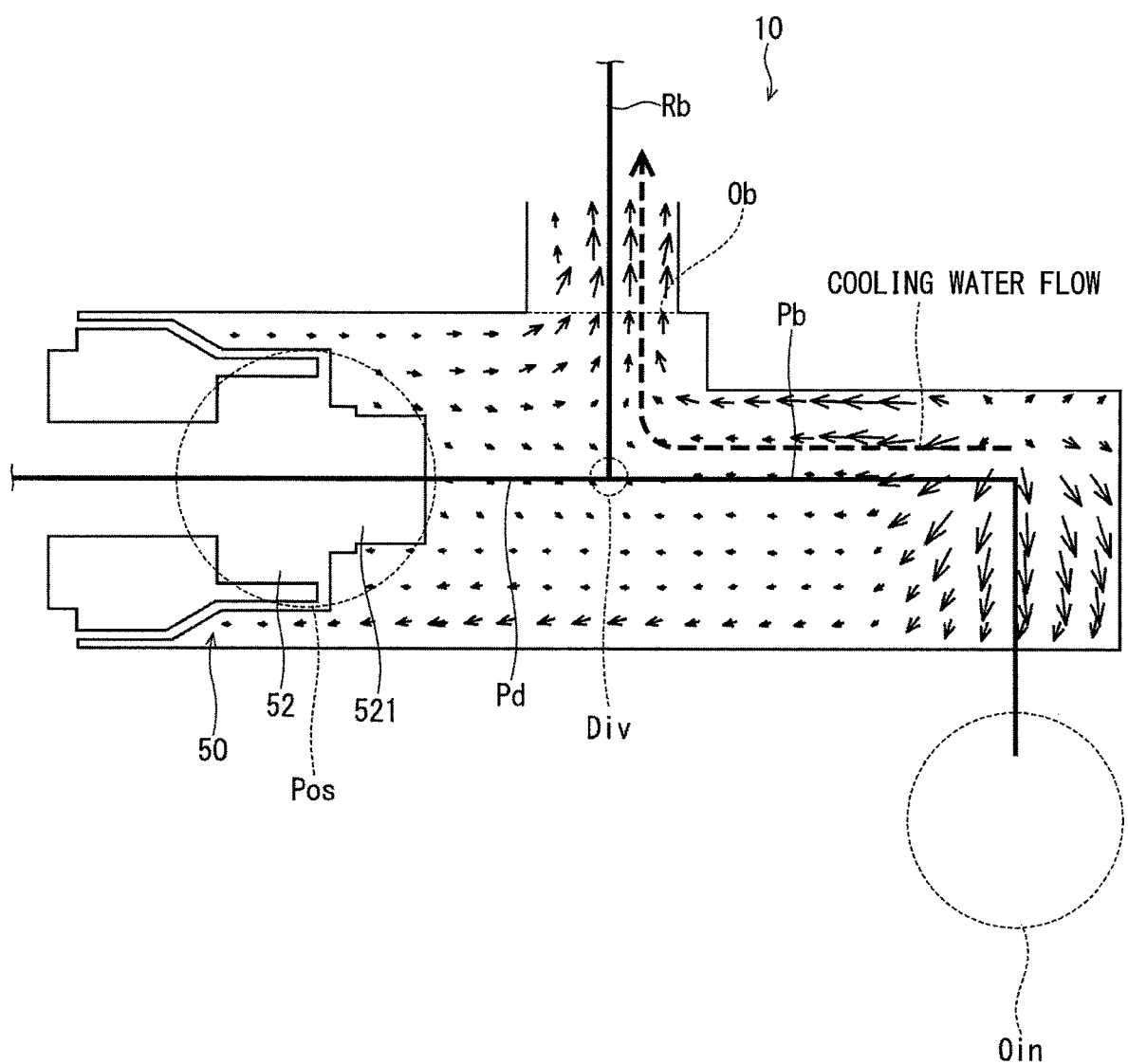
FIG. 6 is a typical cross-sectional side view showing a flow of cooling water in cooling water control valve device according to the first embodiment.
Figure 7:
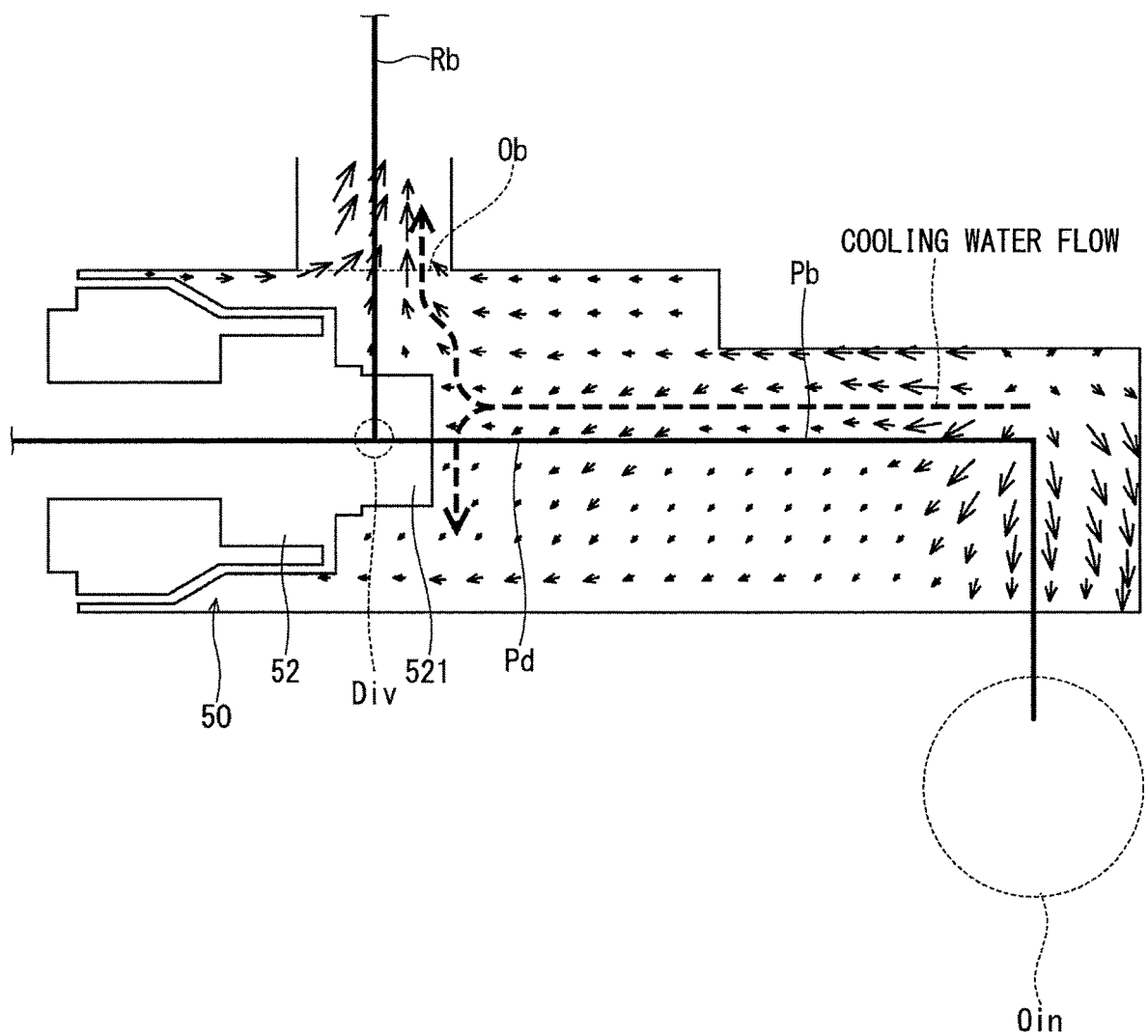
FIG. 7 is a typical cross-sectional side view showing a flow of cooling water in cooling water control valve device according to the comparative embodiment.

FIG. 6 shows a flow simulation of cooling water in the bypass channel Pb and the detour passage Pd in the cooling water control valve device 10 in the present embodiment. FIG. 7 shows a flow simulation of cooling water in the bypass channel Pb and the detour passage Pd in the cooling water control valve device in the comparative embodiment. The flow direction of cooling water is shown by the direction of arrows in FIGS. 6 to 7, and the flow velocity of cooling water is shown by the size of arrows. This simulates the water flows when a relatively large amount of cooling water flows into the bypass channel Pb.

As shown in FIG. 6, in the present embodiment, cooling water flowing from the inlet port Oin to the bypass passage Rb flows smoothly in the bypass channel Pb without interrupting by the temperature detection medium 52. On the other hand, as shown in FIG. 7, in the comparative embodiment, cooling water flowing from the inlet port Oin to the bypass passage Rb is restricted from flowing by the temperature detection medium 52, and this interrupt smooth water flow in the bypass channel Pb.

Figure 8:
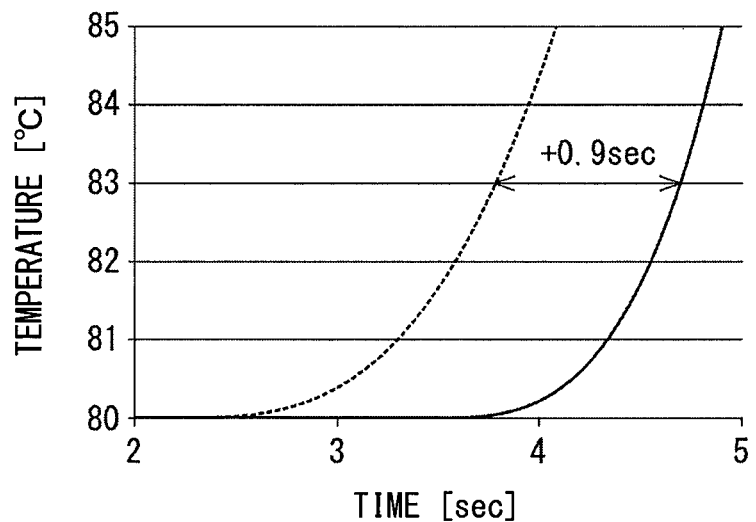
FIG. 8 shows temperature changes of a temperature detection medium with elapsed time when small amount of cooling water is flowed in cooling water control valve device according to the first embodiment and the comparative embodiment.

A difference in temperature change of the temperature detection medium 52 between the cooling water control valve device 10 in the present embodiment and the cooling water control valve device in the comparative embodiment is described with reference to FIGS. 8 and 9. FIG. 8 shows the temperature change of the temperature detection medium 52 with elapsed time when cooling water at relatively low temperature, for example around 90 degree Celsius, flows by a relatively small flow amount, for example about 5 L/min, from the inlet port Oin to the bypass passage Rb in the embodiment and the comparative embodiment. In FIG. 8, a solid line shows a change in temperature of the temperature detection medium 52 in the present embodiment, and a broken line shows a change in temperature of the temperature detection medium 52 in the comparative embodiment.

As shown in FIG. 8, the temperature of the temperature detection medium 52 in the comparative embodiment rises faster when the flow amount of cooling water which flows from the inlet port Oin to the bypass passage Rb, that is, the flow amount of cooling water flowing in the bypass passage Rb is relatively small.

Figure 9:
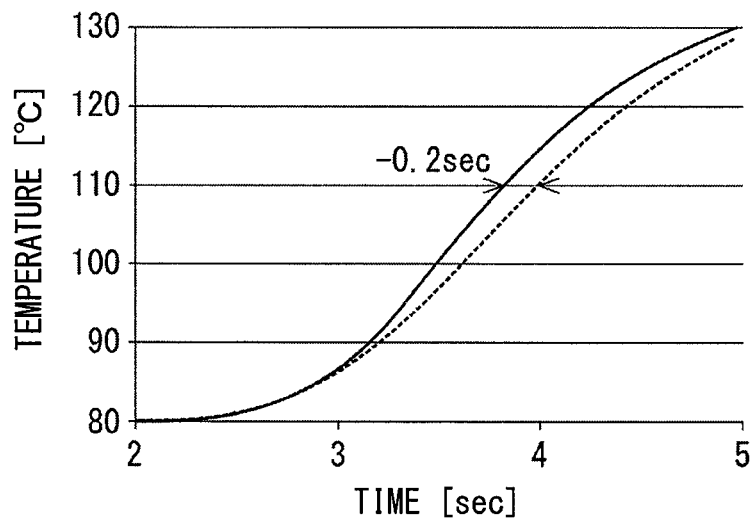
FIG. 9 shows temperature changes of a temperature detection medium with elapsed time when large amount of cooling water is flowed in cooling water control valve device according to the first embodiment and the comparative embodiment.

FIG. 9 shows a change in temperature of the temperature detection medium 52 with elapsed time when cooling water at relatively high temperature, for example around 130 degree, flows by a relatively large flow amount, for example about 10 L/min, from the inlet port Oin to the bypass passage Rb in the embodiment and the comparative embodiment. In FIG. 9, a solid line shows the change in temperature of the temperature detection medium 52 in the embodiment, and a broken line shows the change in temperature of the temperature detection medium 52 in the comparative embodiment. As shown in FIG. 9, the temperature of the temperature detection medium 52 in the present embodiment rises faster when the flow amount of cooling water which flows from the inlet port Oin to the bypass passage Rb, that is, the flow amount of cooling water which flows in the bypass passage Rb is relatively large. It is conceivable that this is because, in the comparative embodiment, a flow resistance against water in the bypass channel Pb increases when the flow amount of cooling water flowing in the bypass channel Pb is large, and an amount of water passing from a heat source to the temperature detection medium 52 decreases. As described above, the present embodiment makes the temperature detection medium 52 more advantageous in a viewpoint of thermal responsiveness than the comparative embodiment especially when the flow amount of cooling water which flows in the bypass passage Rb is large.

The followings describe an operation of the cooling water control valve device 10 in the present embodiment. Because the temperature of the engine 2 is low when the operation of the engine 2 starts, the valve 41 blocks the main passage Rm to prevent cooling water from flowing into the radiator 11 through the main passage Rm. This promotes warming of the engine 2. In this embodiment, when the valve 41 blocks the main passage Rm, the flow amount of cooling water which flows from the inlet port Oin to the bypass passage Rb is about 10 L/min.

When the engine 2 continues to operate, and the temperature of cooling water is raised to a specific temperature or above, the valve 41 is rotatively driven by the motor 31 and opens the main passage Rm. This operation enables cooling water in the water jacket 4 to flow to the radiator 11 through the main passage Rm and return to the water jacket 4 after being cooled. Therefore, this operation enables the engine 2 to cool and restrain overheating. At this point, an opening of the valve 41 is controlled in accordance with the temperature of cooling water.

If the valve 41 is unable to rotate due to abnormality or the like, the main passage Rm might be kept blocked. If the engine 2 keeps on driving while the main passage Rm is blocked, cooling water is not cooled in the radiator 11 and might reach excessively high temperature. However, in this embodiment, the failsafe valve 50 is provided to the detour passage Pd, and the valve body 51 is opened by the temperature detection medium 52 when the temperature of cooling water in the detour passage Pd is raised to a specific temperature, for example, about 110 degree Celsius, or above. In this way, cooling water flowing in the bypass channel Pb at high temperature flows to the main passage Rm through the detour passage Pd. As a result, cooling water which has been cooled in the radiator 11 returns to the engine 2. The configuration enables the engine 2 to prevent overheating which is caused by abnormality in the valve 41. In the present embodiment, because the temperature detection medium 52 has high thermal responsiveness when the flow amount of cooling water which flows in the bypass passage Rb is large, the failsafe valve 50 opens rapidly when an abnormality occurs in the valve 41 and the like.

As described above, according to the present embodiment, the cooling water control valve device 10 controls the flow amount of cooling water flowing in the main passage Rm in the engine cooling system 1. The engine cooling system 1 includes the main passage Rm, through which cooling water flows from the engine 2 to the radiator 11, and the bypass passage Rb which is the passage bypassing the radiator 11 and connects to the engine 2 to return cooling water to the engine 2. The cooling water control valve device 10 also includes the valve 41, the detour passage Pd, and the failsafe valve 50. The valve 41 is configured to control the flow amount of cooling water flowing in the main passage Rm. The detour passage Pd connects the engine 2 to the main passage Rm through the valve 41. The failsafe valve 50 includes the valve body 51 which operates independently from the valve 41 and enables to open and close the detour passage Pd, and the temperature detection medium 52 which manipulates the valve body 51 based on the temperature of cooling water and enables to open and close the detour passage Pd. In the present embodiment, the branch point Div is the point at which the inlet point Oin in which cooling water from the engine 2 flows is branched to the bypass passage Rb and the detour passage Pd. In this embodiment, the temperature detection medium 52 does not protrude to the branch portion Div and is housed in the detour passage Pd. Therefore, when cooling water flows in the bypass passage Rb, this configuration enables to restrain a resistance by the temperature detection medium 52 against the flow of cooling water in the bypass channel Pb. This restrains the increase in a flow resistance against cooling water flowing in the bypass channel Pb. This configuration enables to restrain a decrease in the flow amount of water from a heat source and improve a thermal response of the temperature detection medium 52.

In addition, in this president embodiment, the temperature detection medium 52 is provided at the position Pos which is communicated to the inlet port Oin and the bypass passage Rb, not in the bypass channel Pb which is the passage connecting the inlet port Oin in which cooling water from the engine 2 flows to the bypass passage Rb. Therefore, when cooling water flows in the bypass passage Rb, this configuration restrains the temperature detection medium 52 from resisting cooling water flowing in the bypass passage Rb and enables to guide cooling water to flow to the temperature detection medium 52. This configuration enables to restrain a decrease in the flow amount of water from a heat source and improve thermal response of the temperature detection medium 52.

In addition, according to the present embodiment, the bypass passage opening Ob, which is an inlet port for the bypass passage Rb, and the temperature detection medium 52 are equipped in order toward the detour passage Pd from the inlet port Oin in which cooling water from the engine 2 flows. When cooling water flows in the bypass passage Rb, this configuration enables to restrain the temperature detection medium 52 from resisting cooling water flowing in the bypass passage Rb and enables to guide cooling water to flow to the temperature detection medium 52. Therefore, this configuration enables to restrain the decrease in the flow amount of water from the heat source and improve thermal response of the temperature detection medium 52.

In addition, according to the present embodiment, the cooling water control valve device 10 controls the flow amount of cooling water flowing in the main passage Rm in the engine cooling system 1. The engine cooling system 1 includes the main passage Rm, through which cooling water flows from the engine 2 to the radiator 11, and the bypass passage Rb which is the passage bypassing the radiator 11 and connected to the engine 2 to return cooling water to the engine 2. The cooling water control valve device 10 includes the housing 20, the valve 41, and the failsafe valve 50. The housing 20 is provided between the engine 2, the main passage Rm, and the bypass passage Rb and includes the inlet port Oin, the main passage opening Om, the bypass passage opening Ob, the main channel Pm, the bypass channel Pb, and the detour passage Pd. The inlet port Oin is connected to the engine 2, and cooling water from the engine 2 flows into the inlet port Oin. The main passage opening Om is connected to the main passage Rm, and cooling water flows to the main passage Rm through the main passage opening Om. The bypass passage opening Ob is connected to the bypass passage Rb, and cooling water flows to the bypass passage Rb through the bypass passage opening Ob. The main channel Pm connects the inlet port Oin to the main passage opening Om. The bypass channel Pb connects the inlet port Oin to the bypass passage opening Ob. The detour passage Pd is the passage connecting the bypass channel Pb to the main passage Rm by detouring the valve 41. The valve 41 is accommodated in the housing 20 and configured to control a flow amount of cooling water which flows from the inlet port Oin to the main passage Rm. The failsafe valve 50 includes the valve body 51, which operates independently from the valve 41 and enables the detour passage Pd to open and close, and the temperature detection medium 52 which manipulates the valve body 51 based on the temperature of cooling water and enables the detour passage Pd to open and close.

In the present embodiment, the temperature detection medium 52 does not protrude to the bypass channel Pb and is housed in the detour passage Pd. Therefore, when cooling water flows in the bypass passage Rb, this configuration enables to restrain a resistance by the temperature detection medium 52 against the flow of cooling water in the bypass channel Pb. This operation restrains the increase in the flow resistance of cooling water flowing in the bypass channel Pb. Therefore, this restrains the flow amount of water from the heat source from decreasing and enhances thermal response of the temperature detection medium 52.

In addition, in the present embodiment, the temperature detection medium 52 is provided at the position Pos which is communicated to the inlet port Oin and the bypass passage opening Ob, not in the bypass channel Pb which is a passage connecting the inlet port Oin to bypass passage opening Ob. Therefore, when cooling water flows in the bypass passage Rb, this enables to restrain the temperature detection medium 52 from resisting cooling water flowing in the bypass passage Rb and enables cooling water to flow to the temperature detection medium 52. This enables to restrain a decrease in the flow amount of water from the heat source and improve thermal response of the temperature detection medium 52.

Thus, in this embodiment, the bypass passage opening Ob is provided on the side of the inlet port Oin relative to the temperature detection medium 52 in the passage connecting the inlet port Oin to the main passage Rm through the bypass channel Pb and the detour passage Pd. Therefore, when cooling water flows in the bypass passage Rb, this restrains the temperature detection medium 52 from resisting cooling water flowing in the bypass passage Rb and enables cooling water to flow to the temperature detection medium 52.

Thus, in this embodiment, the temperature detection medium 52 is provided at the position Pos which is distant from the bypass channel Pb, which is a passage connecting the inlet port Oin to the bypass passage opening Ob by the shortest distance. Therefore, when cooling water flows in the bypass passage Rb, this enables to restrain a resistance by the temperature detection medium 52 against the flow of cooling water in the bypass channel Pb.

In the present embodiment, the temperature detection medium 52 includes the temperature sensitive portion 521 filled with a thermowax. Therefore, it is enabled to manufacture the temperature detection medium 52 at relatively low cost.

Second Embodiment

Figure 10:
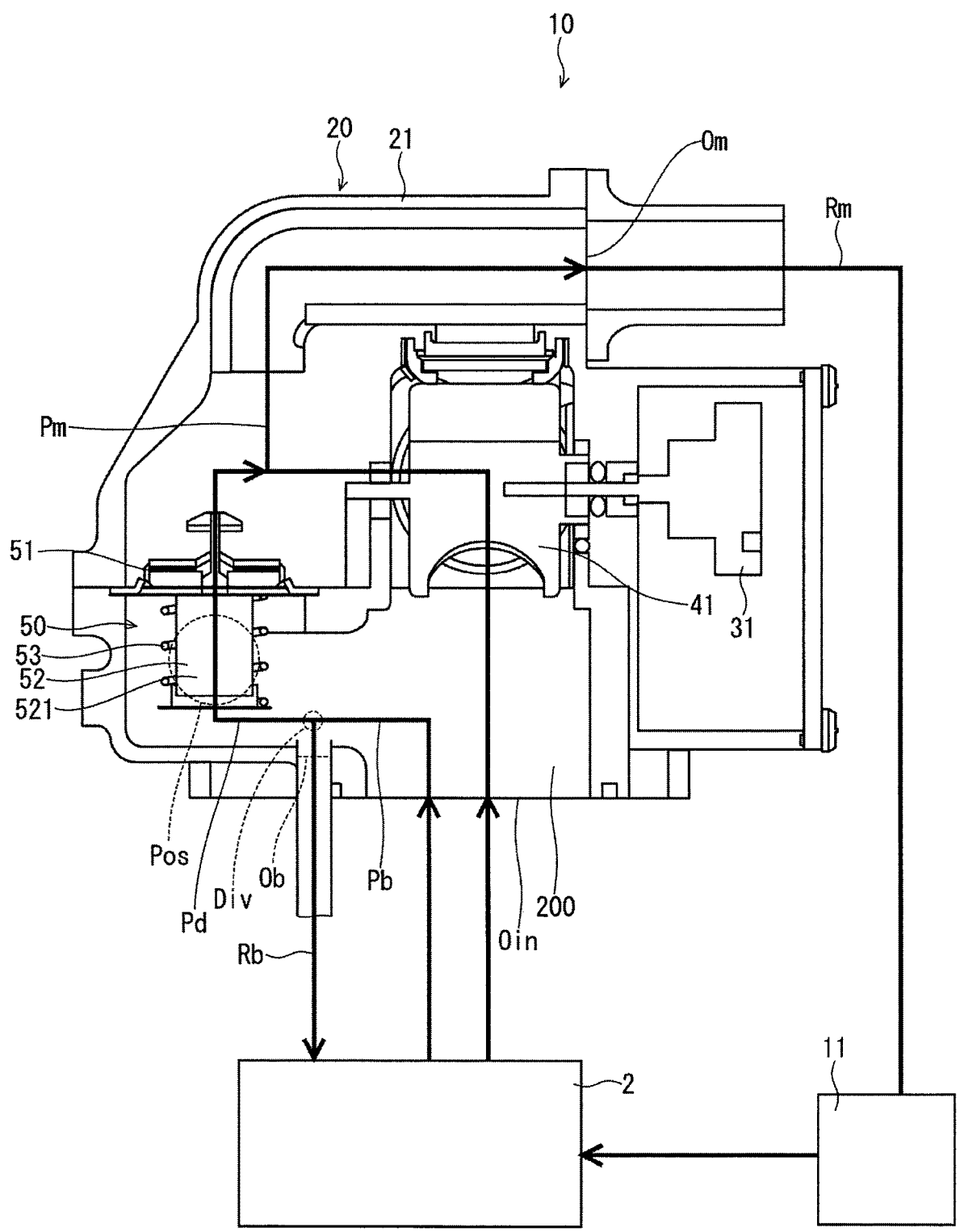
FIG. 10 is a cross-sectional side view showing the cooling water control valve device according to the second embodiment.

FIG. 10 shows a cooling water control valve device according to a second embodiment. Also in the second embodiment, the branch point Div is a point at which is the inlet point Oin in which cooling water from the engine 2 flows is branched to the bypass passage Rb and the detour passage Pd. In the second embodiment, the temperature detection medium 52 does not protrude to the branch portion Div and is housed in the detour passage Pd. In other words, the temperature detection medium 52 does not protrude to the bypass channel Pb and is housed as a whole in the detour passage Pd. Further in other words, the temperature detection medium 52 is provided at the position Pos which is communicated to the inlet port Oin and the bypass passage Rb, not in the bypass channel Pb which is the passage directed from the inlet port Oin in which cooling water from the engine 2 flows to the bypass passage Rb. Further in other words, the temperature detection medium 52 is provided at the position Pos which is at a distance equal to or more than a predetermined distance from the bypass channel Pb which is a passage connecting the inlet port Oin to the bypass passage opening Ob in the shortest distance. In addition, according to the embodiment, the bypass passage opening Ob which is the inlet port of the bypass passage Rb and the temperature detection medium 52 are formed in other toward the detour passage Pd from the inlet port Oin in which cooling water from the engine 2 flows. In the present embodiment, the bypass passage opening Ob is closer to the inlet port Oin than the temperature detection medium 52 in a passage connecting the inlet port Oin to the main passage Rm through the bypass channel Pb and the detour passage Pd. The second embodiment produces the same effect as a first embodiment.

Third Embodiment

Figure 11:
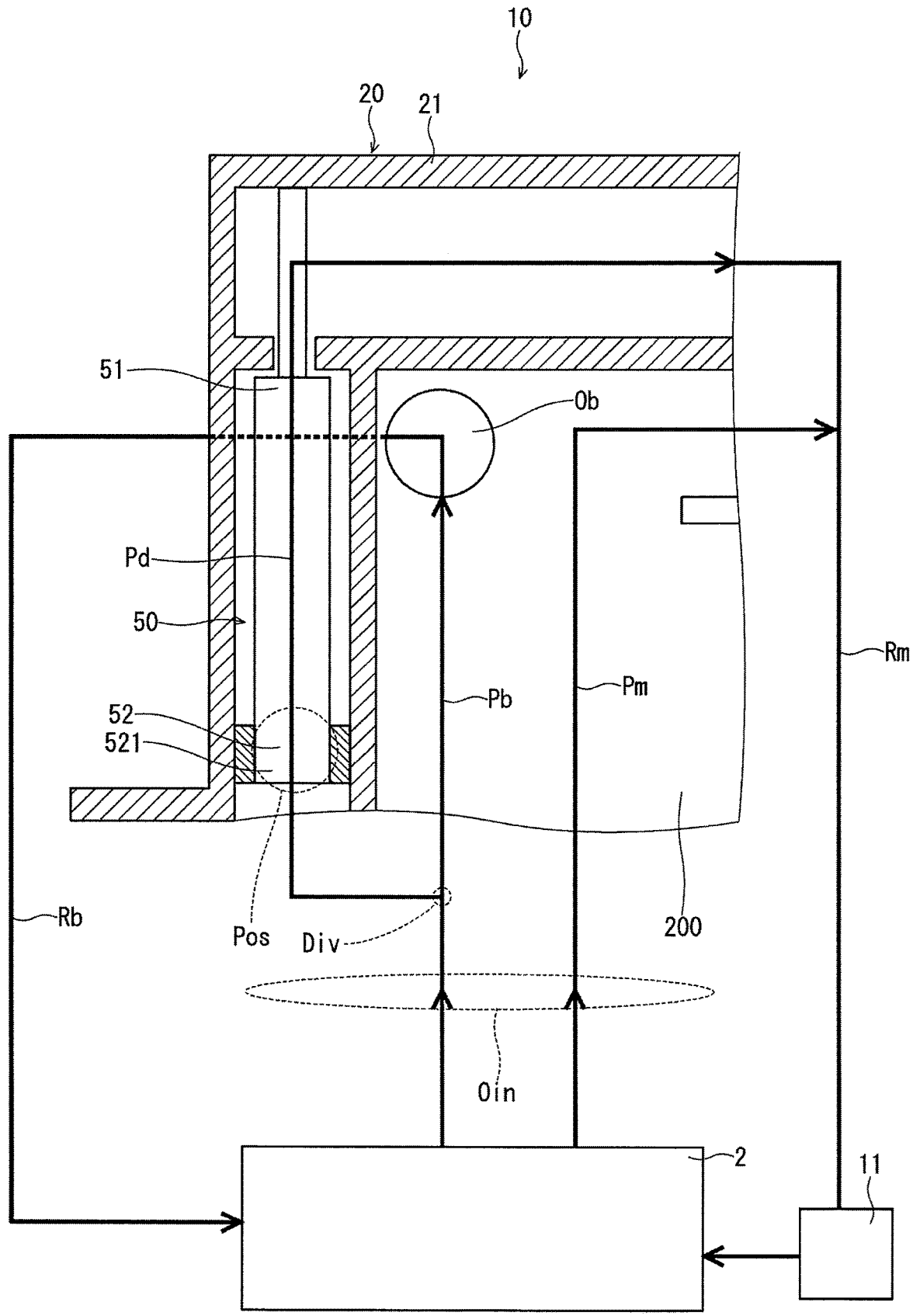
FIG. 11 is a cross-sectional side view showing a part of the cooling water control valve device according to a third embodiment.
Figure 12:
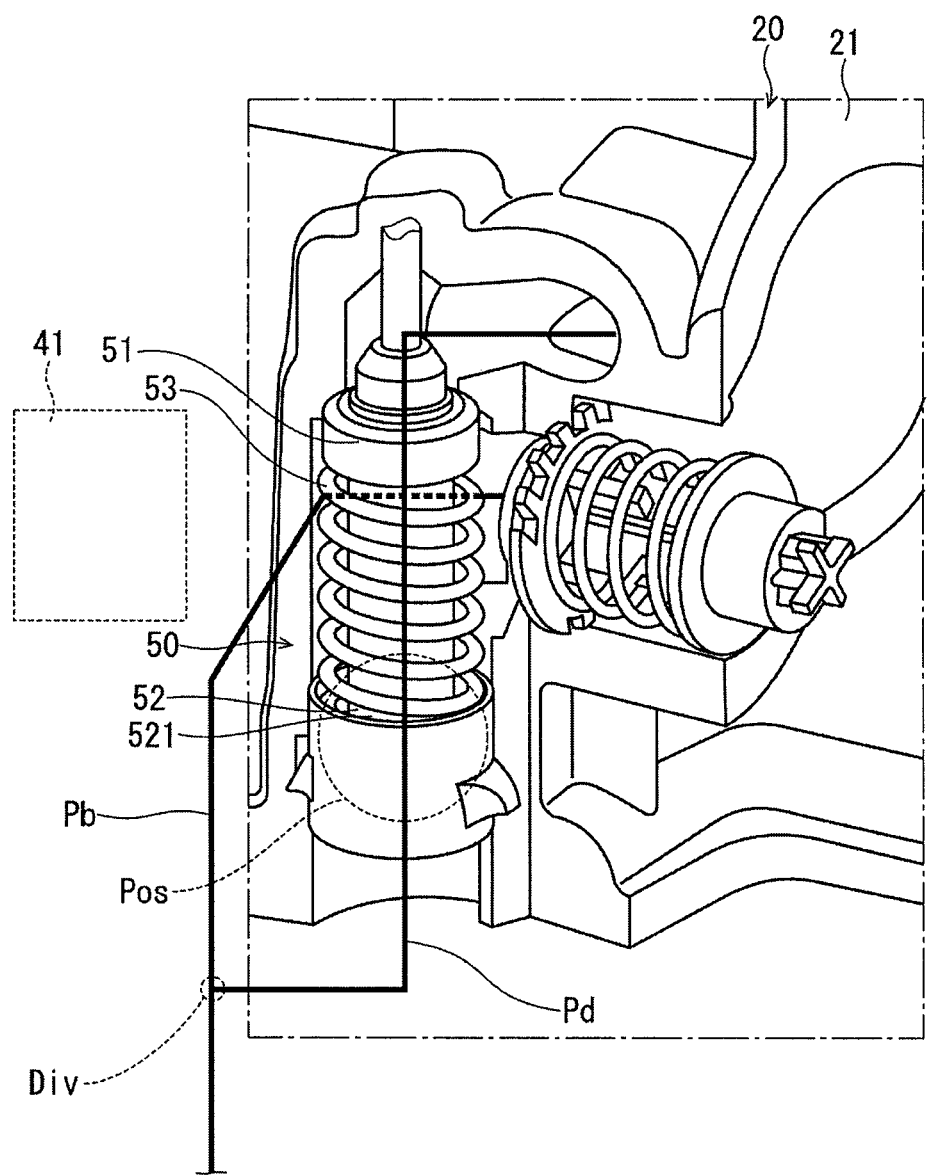
FIG. 12 is a diagrammatic perspective view showing a part of the cooling water control valve device according to the third embodiment.
Figure 13:
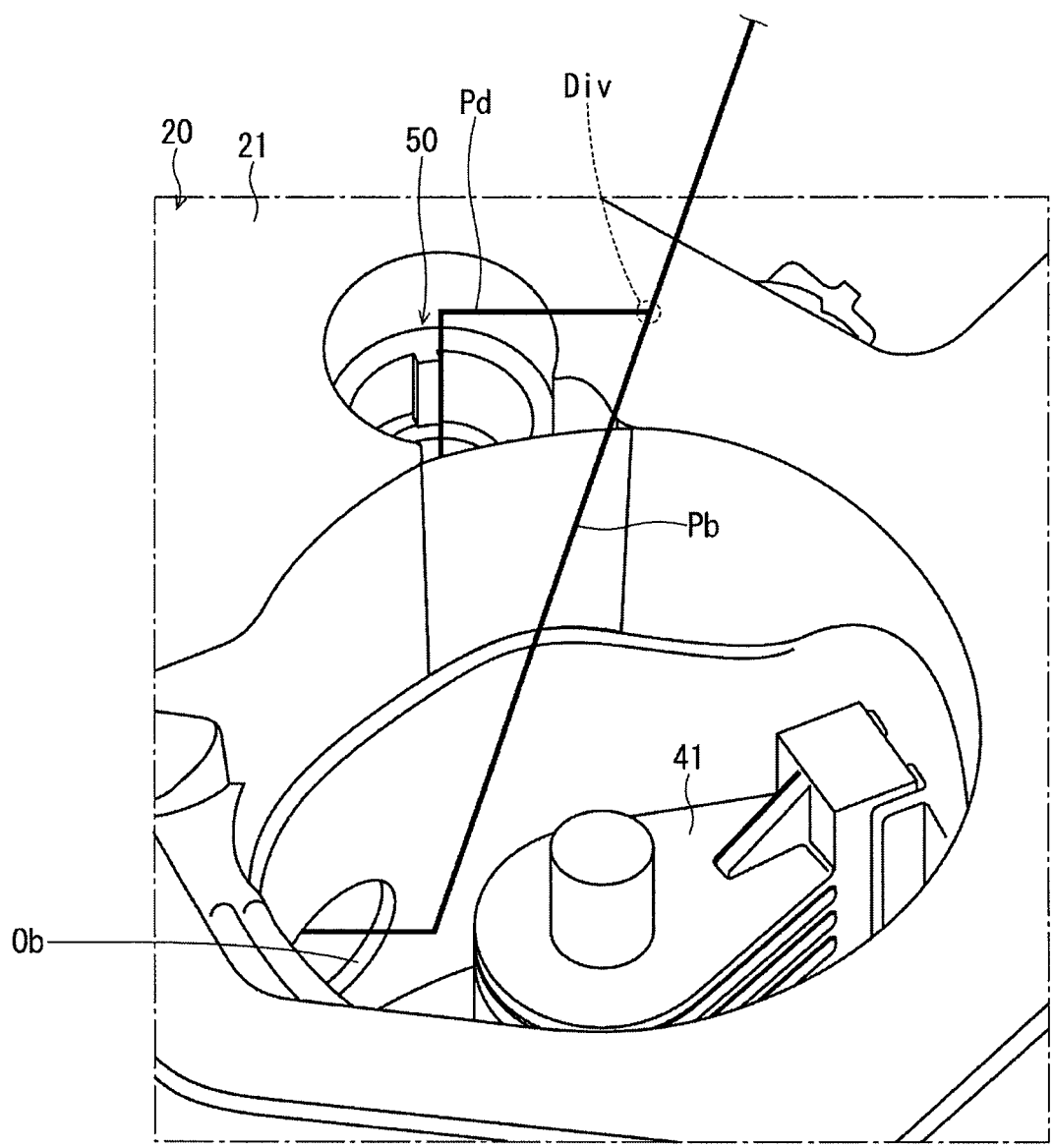
FIG. 13 is a diagrammatic perspective view showing a part of the cooling water control valve device according to the third embodiment.

FIGS. 11 to 13 show the cooling water control valve device according to a third embodiment. Also in the third embodiment, the branch point Div is a point at which the inlet point Oin in which cooling water from the engine 2 flows is branched to the bypass passage Rb and the detour passage Pd. In the third embodiment, the temperature detection medium 52 does not protrude to the branch portion Div and is housed as a whole in the detour passage Pd. In other words, the temperature detection medium 52 does not protrude to the bypass channel Pb and housed as a whole in the detour passage Pd. Further in other words, the temperature detection medium 52 is provided at the position Pos which is communicated to the inlet port Oin and the bypass passage Rb, not in the bypass channel Pb which is a passage connecting the inlet port Oin in which cooling water from the engine 2 flows to the bypass passage Rb. Further in other words, the temperature detection medium 52 is provided at the position Pos which is at a distance equal to or more than a predetermined distance from the bypass channel Pb which is a passage connecting the inlet port Oin to the bypass passage opening Ob in the shortest distance. The third embodiment performs the same effect as a first embodiment.

OTHER EMBODIMENT

According to another embodiment, the temperature at which the failsafe valve 50 opens may be set at a temperature other than 110 degree Celsius.

Above embodiments show examples of the control of the flow amount of cooling water in the main passage Rm only with the valve 41. On the other hand, in this other embodiment of the present disclosure, the flow amount of cooling water in the main passage Rm may be controlled with the failsafe valve 50 in addition to the valve 41 in a normal condition. For example, a configuration may be employable to set an upper limit of the cooling water temperature at which the valve 41 closes the main passage Rm. In this configuration, when the cooling water temperature reaches the upper limit, the valve 41 may be closed, and the failsafe valve 50 may be opened at a temperature substantially the same as this upper limit. This configuration enables to reduce an operation time of the valve 41 and to improve a life cycle of the valve 41.

In this other embodiment, as long as the temperature detection medium 52 enables the valve body 51 to open and close at a set temperature by a displacement with temperature change, the temperature detection medium 52 may include not only the temperature sensitive portion 521 including thermowax, but also a thermostat, a bimetal, a shape memory alloy, or the like. In another embodiment, the housing 20 may be made of not only a resin, but also a metal or the like.

The present disclosure is not limited to the above embodiments and/or modifications but can be further modified in various manners without departing from a spirit of the present disclosure.

The present disclosure has been described according to the present embodiments. However, the present disclosure is not limited by the embodiments or structure. The present disclosure encompasses various variations and modifications within equivalents. This present disclosure also encompasses various combinations and embodiments, and furthermore, encompasses one or more or less of elements and combinations thereof.

The invention claimed is:

1. A cooling water control valve device that controls a flow amount of cooling water, which flows through a main passage of an engine cooling system, the engine cooling system including a main passage, through which cooling water flows from an engine to a radiator, and a bypass passage, which bypasses the radiator and is connected to the engine to return cooling water, which flows from the engine, to the engine, the cooling water control valve device comprising:
   a valve configured to control a flow amount of cooling water flowing through the main passage;
   a detour passage that bypasses the valve and connects the engine to the main passage; and
   a failsafe valve including a valve body operational individually from the valve and configured to open and close the detour passage and a temperature detection medium configured to manipulate the valve body according to a temperature of cooling water to enable to open and close the detour passage, wherein a branch portion is a portion at which an inflow port, into which cooling water from the engine flows, is branched into the bypass passage and the detour passage, and the temperature detection medium is entirely accommodated in the detour passage without protruding into the branch portion.

2. A cooling water control valve device that controls a flow amount of cooling water, which flows through a main passage of an engine cooling system, the engine cooling system including a main passage, through which cooling water flows from an engine to a radiator, and a bypass passage, which bypass the radiator and is connected to the engine to return cooling water, which flows from the engine, to the engine, the cooling water control valve device comprising:

a valve configured to control a flow amount of cooling water flowing through the main passage;

a detour passage that bypasses the valve and connects the engine to the main passage; and, a failsafe valve including a valve body operational individually from the valve and configured to open and close the detour passage and a temperature detection medium configured to manipulate the valve body according to a temperature of cooling water to enable to open and close the detour passage, wherein the temperature detection medium is provided at a position which is communicated to the inlet port and the bypass passage and is different from a channel directed from an inlet port, in which cooling water from the engine flows, to the bypass passage.

3. A cooling water control valve device that controls a flow amount of cooling water, which flows through a main passage of an engine cooling system, the engine cooling system including a main passage, through which cooling water flows from an engine to a radiator, and a bypass passage, which bypasses the radiator and is connected to the engine to return cooling water, which flows from the engine, to the engine, the cooling water control valve device comprising:

a valve configured to control a flow amount of cooling water flowing through the main passage;

a detour passage that bypasses the valve and connects the engine to the main passage; and a failsafe valve including a valve body operational individually from the valve and configured to open and close the detour passage and a temperature detection medium configured to manipulate the valve body according to a temperature of cooling water to enable to open and close the detour passage, wherein a bypass passage opening, which is an inlet port of the bypass passage, and the temperature detection medium are equipped in this order toward the detour passage from an inlet port, in which cooling water from the engine flows.

4. A cooling water control valve device that controls a flow amount of cooling water, which flows through a main passage of an engine cooling system, the engine cooling system including a main passage, through which cooling water flows from an engine to a radiator, and a bypass passage, which bypasses the radiator and is connected to the engine to return cooling water, which flows from the engine, to the engine, the cooling water control valve device comprising:

an inlet port that is provided among the engine, the main passage and the bypass passage and into which cooling water from the engine flows;

a main passage opening that is connected to the main passage and into which cooling water to the main passage flows;

a bypass passage opening that is connected to the bypass passage and into which cooling water to the bypass passage flows;

a main channel that connects the inlet port to the main passage opening;

a bypass channel that connects the inlet port to the bypass passage opening;

a housing that includes a detour passage that bypass a valve and connects the bypass channel to the main passage;

the valve that is housed in the housing and configured to control a flow amount of cooling water flowing from the inlet port to the main passage; and a failsafe valve including a valve body operational individually from the valve and configured to open and close the detour passage and a temperature detection medium configured to manipulate the valve body according to a temperature of cooling water to enable to open and close the detour passage, wherein the temperature detection medium is housed in the detour passage without protruding the bypass channel.

5. The cooling water control valve device according to claim 4, wherein the temperature detection medium is provided at a position, which is communicated to the inlet port and the bypass passage opening, and is different from a channel connecting the inlet port to the bypass passage opening.

6. The cooling water control valve device according to claim 4, wherein the bypass passage opening is located closer to the inlet port than the temperature detection medium in a passage, which is directed from the inlet port to the main passage through the bypass channel and the detour passage.

7. The cooling water control valve device according to claim 4, wherein the temperature detection medium is provided at a position which is at a distance equal to or more than a predetermined distance from the bypass channel, which is a shortest path connecting the inlet port to the bypass passage opening.

8. The cooling water control valve device according to claim 1, wherein the temperature detection medium includes a temperature sensitive portion containing a thermowax.

* * * * *